United States Patent
Lin et al.

(10) Patent No.: US 8,147,072 B2
(45) Date of Patent: Apr. 3, 2012

(54) COOLING MODULE FOR USE WITH A PROJECTION APPARATUS

(75) Inventors: Chia-Jui Lin, Taoyuan County (TW); Kuo-Ching Chang, Taoyuan County (TW); Hui-Chih Lin, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 846 days.

(21) Appl. No.: 11/626,133

(22) Filed: Jan. 23, 2007

(65) Prior Publication Data

US 2008/0043439 A1 Feb. 21, 2008

(30) Foreign Application Priority Data

Aug. 21, 2006 (TW) .............................. 95130631 A (51) Int. Cl.
  *G03B 21/16* (2006.01)
  *H05K 7/20* (2006.01)
(52) U.S. Cl. ......................................... 353/52; 361/703
(58) Field of Classification Search ............... 353/52–61, 353/64, 97; 361/703; 454/277, 279
See application file for complete search history.

(56) References Cited

U.S. PATENT DOCUMENTS

| | | | | |
|---|---|---|---|---|
| 5,341,230 A * | 8/1994 | Smith | | 359/13 |
| 6,741,468 B2 * | 5/2004 | Jing et al. | | 361/700 |
| 6,781,835 B2 * | 8/2004 | Hashimoto et al. | | 361/697 |
| 6,883,594 B2 * | 4/2005 | Sarraf et al. | | 165/104.33 |
| 6,903,930 B2 * | 6/2005 | DiStefano et al. | | 361/700 |
| 7,084,931 B2 * | 8/2006 | Tabuchi et al. | | 348/748 |
| 7,220,365 B2 * | 5/2007 | Qu et al. | | 252/70 |
| 7,264,359 B2 * | 9/2007 | Kawahara et al. | | 353/54 |
| 7,327,574 B2 * | 2/2008 | Frank et al. | | 361/711 |
| 7,384,152 B2 * | 6/2008 | Takeuchi | | 353/54 |
| 7,674,165 B2 * | 3/2010 | Lu et al. | | 454/184 |
| 2002/0163625 A1 * | 11/2002 | Tabuchi et al. | | 353/31 |
| 2005/0073658 A1 * | 4/2005 | Chang et al. | | 353/52 |
| 2005/0207120 A1 * | 9/2005 | Tseng et al. | | 361/700 |
| 2005/0231917 A1 * | 10/2005 | Lin | | 361/703 |
| 2006/0279706 A1 * | 12/2006 | Bash et al. | | 353/54 |
| 2007/0024814 A1 | 2/2007 | Woo et al. | | |

FOREIGN PATENT DOCUMENTS

| CN | 1904720 A | 1/2007 |
|---|---|---|
| TW | 472919 | 1/2002 |

* cited by examiner

*Primary Examiner* — Georgia Y Epps
*Assistant Examiner* — Danell L Owens
(74) *Attorney, Agent, or Firm* — Patterson Thuente Christensen Pedersen, P.A.

(57) ABSTRACT

A cooling module for use with a DMD module of a projection apparatus is provided. The cooling module includes a heat conduction device, at least one heat pipe, and at least one fin. Heat accumulating on the DMD module can be released from the heat conduction device to the fins through the heat pipe. Meanwhile, the fins partially overlap along the direction of the light coming from the light source. Thus, the fins can also prevent the unused light in the casing of the projection apparatus from leakage.

21 Claims, 13 Drawing Sheets

COOLING MODULE FOR USE WITH A PROJECTION APPARATUS

This application claims priority to Taiwan Patent Application No. 095130631 filed on Aug. 21, 2006, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a cooling module. In particular, the invention relates to a cooling module for use with a DLP projector.

2. Descriptions of the Related Art

Many consumers have chosen to use projectors as their display equipments in offices, homes, and conference rooms. There are two types of conventional projectors: liquid crystal display (LCD) projectors or digital light processing (DLP) projectors. Because DLP projectors apply digital projecting and displaying technologies, they are extremely welcome in the display market.

DLP projectors employ DMD (digital micromirror device) modules as their core technology. The DMD module is composed of a micro mirrors array, fabricated by semiconductor manufacturing processes. Each mirror is a display pixel. When light is projected onto the DMD module from a light source, the micro mirrors of the DMD immediately reflect the light towards the projection lens for image formations according to its image signals.

Figure 1:
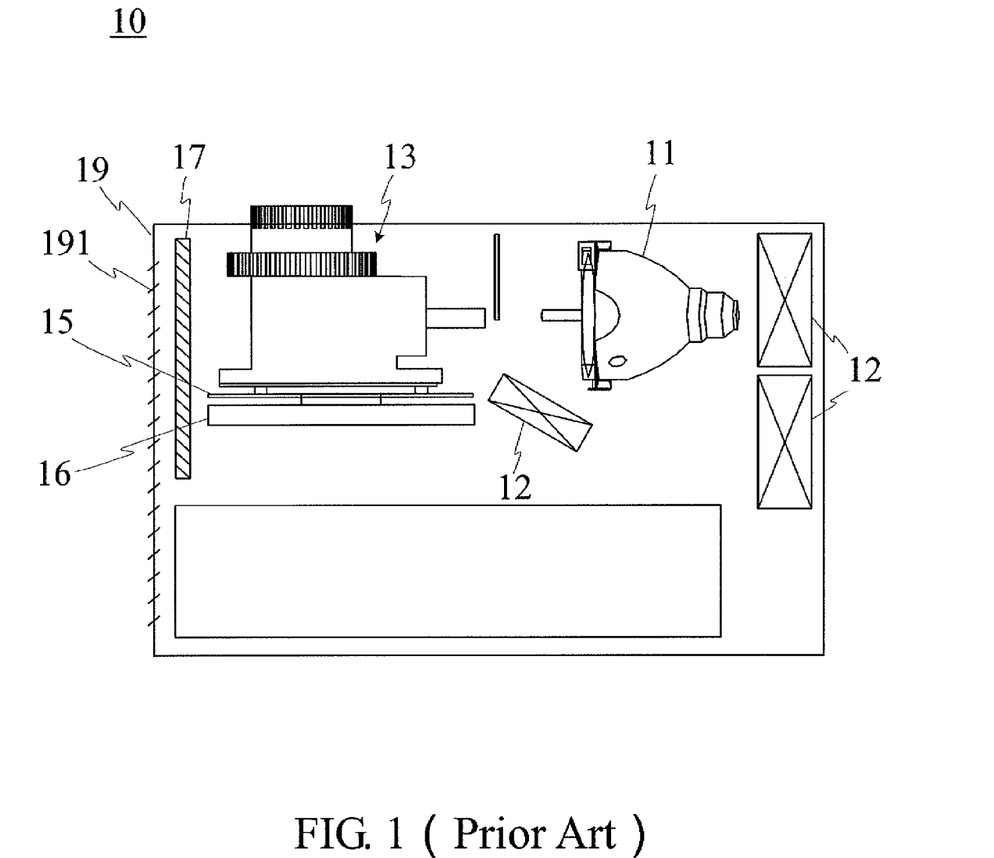
FIG. 1 is a schematic view illustrating the interior of a conventional DLP projector.

However, light possesses energy itself When light hits the DMD module, heat is subsequently generated. Effective cooling for the DMD module quickly turns into an important issue. Conventionally, heat conduction pad, which also work with fans for cooling, have been attached to the DMD modules. A well known DLP projector 10 is shown in FIG. 1. The light that is generated from a light source 11 is partially projected onto a DMD module 15 and through an optical engine 13 for image formations. In general, the DMD module 15 is adjacently in contact with the heat conduction pad 16 to prevent heat accumulation thereon. At least one fan 12 is disposed inside the DLP projector 10 for generating cooling airflows. These cooling airflows can be utilized to cool the pad 16 on the DMD module 15 or even other components in the system as well.

Because the watts and efficiency of the light source 11 have progressively increased in response to the increased use of high-lumen projectors, energy (e.g. light and heat) accumulated on the DMD module 15 has also increased. The use of a larger pad or having greater airflows does not sufficiently cool the DMD module 15. The size of the pad 16 and the rotational speed of the fan 12 have to be controlled according to the size of the product and the noise level. Consequently, it has been increasingly difficult to cool the DMD module 15. Overheats may shorten the DMD module 15 life or even terminate the operation of the projection apparatus early.

Besides, venting apertures 191 are usually disposed on the housing 19 to promote cooling airflows for the DLP projector 10. These venting apertures 191 provide a channel between the interior of the system and the surroundings for heat exchange. With respect to this kind of heat generating system, venting apertures 191 are essential in design. However, due to the light source 11 with high luminance in the projector, partial light which is generated from the light source 11 and is not guided into the optical engine for the DMD module 15 may leak out from the housing 19 and through the venting apertures 191. As a result, this light not only causes discomfort in the user's eye, but also causes light pollution in the projection environment, affecting the projection performance. Moreover, the high temperature may damage the housing 19 and increase the risk of injury to users. Conventionally, a light shelter 17 is usually disposed adjacent to the venting apertures 191 to prevent light from leakage or the user from directly seeing through the light source 11 from the exterior of the system. To block these light leakages, the light shelter 17 disposed on the venting apertures 191 raises airflow resistance instead, which does not benefit for cooling the interior of the DLP projector 10. Furthermore, the increase in airflow resistance may also raise system noises.

Given the above, a novel cooling module that can shield light for use in a projection apparatus is needed in this field.

SUMMARY OF THE INVENTION

The primary objective of this invention is to provide a cooling module for use with a projection apparatus. A heat pipe and a fin are included to release accumulated heat on the DMD module. Thus, the cooling efficiency of the DMD module is subsequently increased, extending its lifetime thereof.

Another objective of this invention is to provide a cooling module for use with a projection apparatus. The fins can provide rapid heat dissipation and also shelter the scattered light from the light source by partially overlapping along the direction of the light source.

To achieve the abovementioned objectives, the present invention discloses a cooling module for use with a projection apparatus which includes a DMD module. The cooling module comprises a heat conduction device in contact with the DMD module, at least one heat pipe, and at least one fin. The heat pipe has a first portion and a second portion which connects to the first portion in heat conduction. The heat pipe connects to the heat conduction device at the first portion thereof, while the fin connects with the second portion of the heat pipe. Thereby, heat generated from the DMD module for processing light can be outwardly removed from the heat conduction device through the heat pipe and the fin. Furthermore, fins can partially and mutually overlap to provide a light sheltering capability.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2:
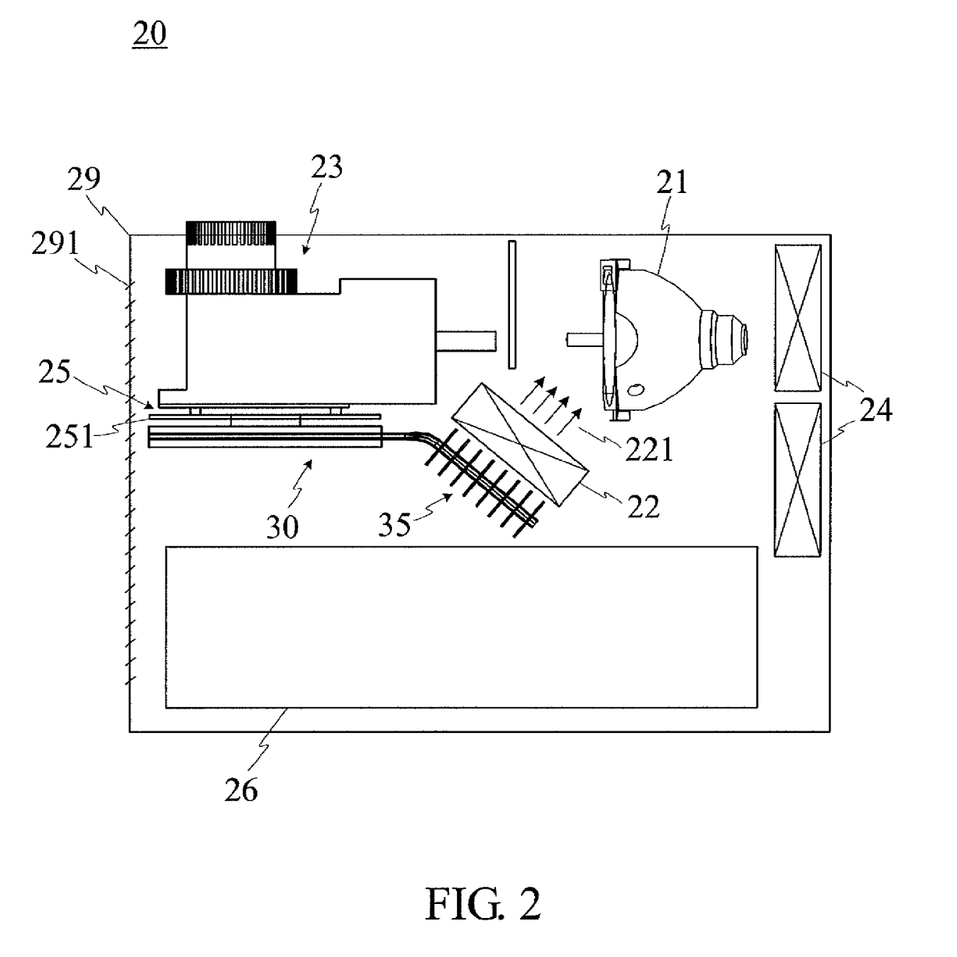
FIG. 2 is a schematic view illustrating the interior of the projection apparatus of the present invention.

FIG. 2 shows the first embodiment of a projection apparatus 20 of the present invention. In general, the projection apparatus 20 comprises a light source 21, an optical engine 23, a DMD module 25, and a cooling module 30. The projection apparatus 20 can further comprise other essential components for projection, for example, a print circuit board 26 which is not described herein. In addition, fans 22, 24 are appropriately disposed in this embodiment to form cooling airflows in the projection apparatus 20. The aforementioned components are all disposed within a housing 29 and integrated to perform a projection function.

The DMD module 25 further comprises a DMD chip 251, which is utilized to process light provided from the light source 21 with the inputted image signals. Thus, the DMD chip 251 is one of the principal heat generating portions in the DMD module 25. The cooling module 30 of the present invention is utilized to cool the DMD module 25 and specifically cool the DMD chip 251 of the DMD module 25.

Figure 3:
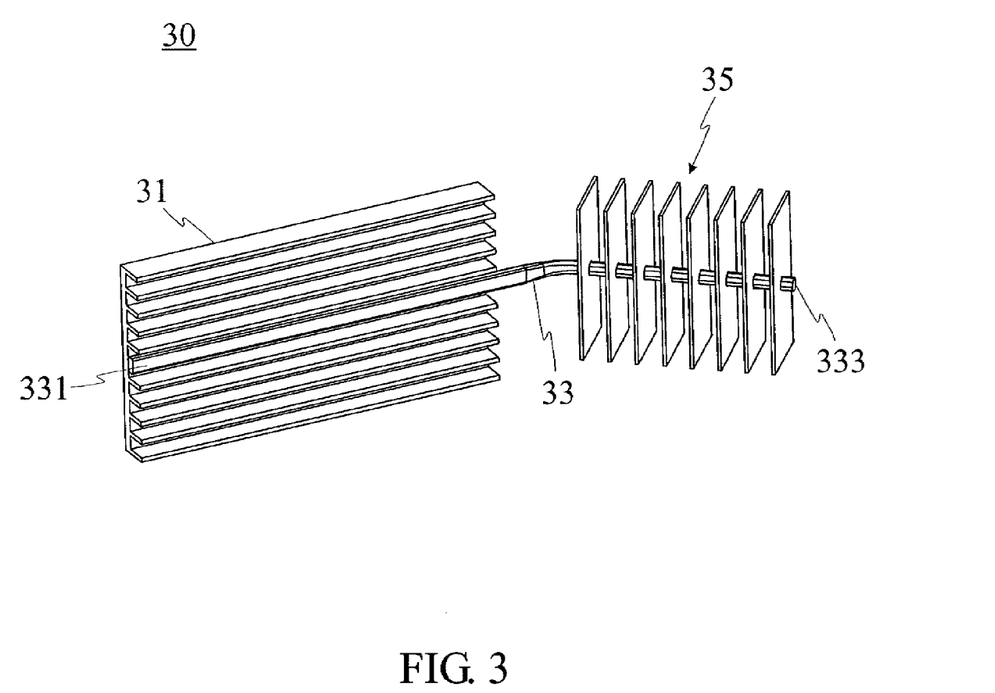
FIG. 3 is a schematic view illustrating the cooling module of the present invention.

FIG. 3 is a schematic view illustrating the cooling module 30. The cooling module 30 generally consists of a heat conduction device 31, at least one heat pipe 33, and at least one fin 35. In this embodiment, one heat pipe 33 and a plurality of fins 35 are illustrated. The heat pipe 33 has a first portion 331 and a second portion 333 in which the first portion 331 connects to the heat conduction device 31 and the second portion 333 connects through the plurality of fins 35. Because the first portion 331 and the second portion 333 are in heat conduction, heat generated from the DMD module 25 for processing light can be outwardly removed from the heat conduction device 31 through the heat pipe 33 and the fins 35. In this case, the heat conduction device 31 is in contact with the DMD module 25; more specifically, in contact with the DMD chip 251. In actuality, the heat pipe 33 can be integrally formed with the heat conduction device 31, or alternatively, the heat pipe 33 can be welded or adhered to the heat conduction device 31 during the manufacturing process.

Figure 4A:
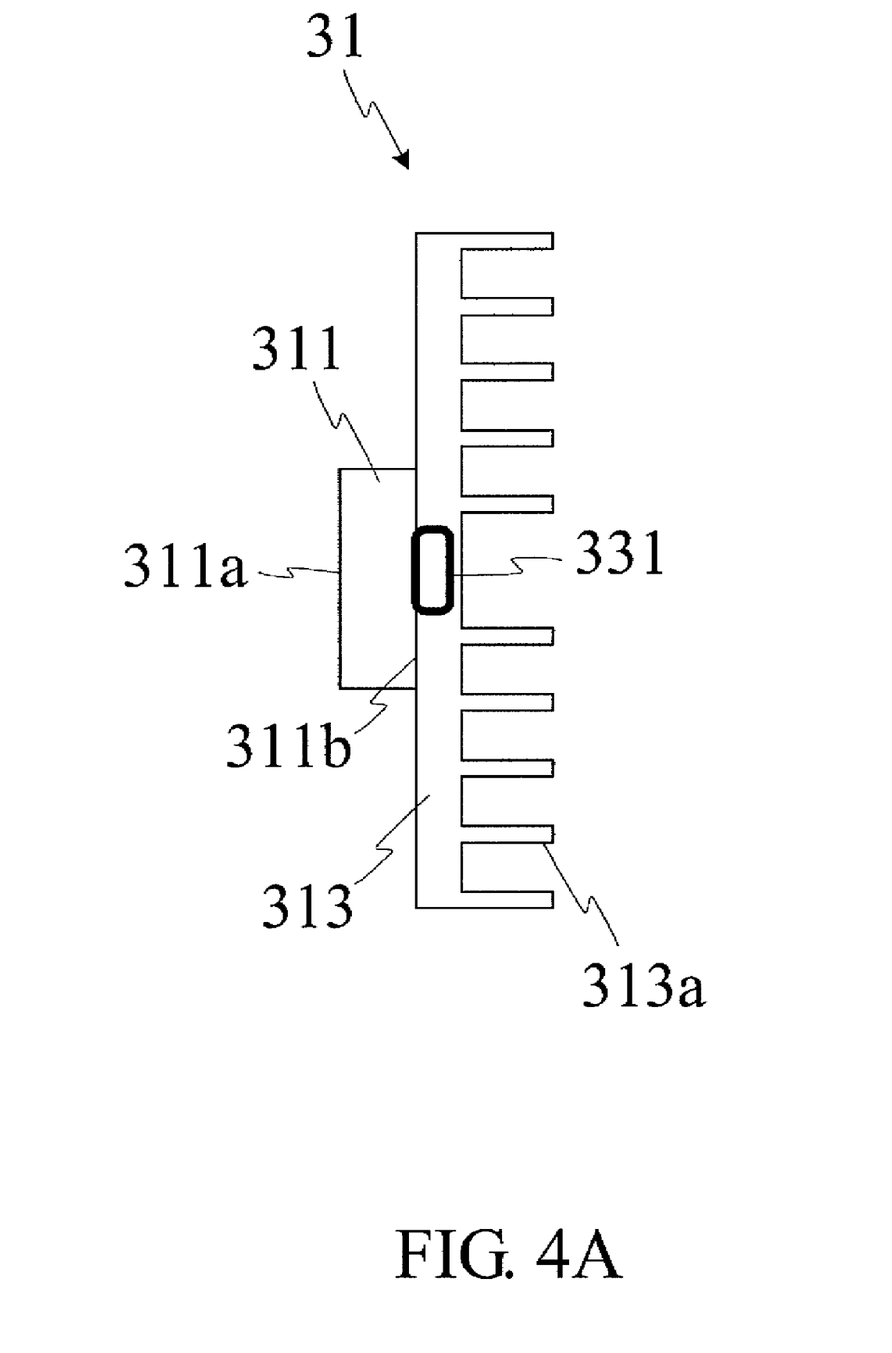
FIGS. 4A to 4C are schematic views illustrating the embodiments of the heat conduction device of the present invention.

A cross-sectional view of the heat conduction device 31 is shown in FIG. 4A as another embodiment. The heat conduction device 31 includes a contact portion 311 which has a first surface 311a and a second surface 311b opposite to the first surface 311a. In application, the first surface 311a can be adjacently in contact with the DMD chip 251 while the first portion 331 of the heat pipe 33 can connect to the second surface 311b. Preferably, the heat conduction device 31 further comprises a heat conduction base 313 adjacent to the second surface 311b of the contact portion 311. As compared with the contact portion 311, the heat conduction base 313 possesses a greater area for enhancing heat dissipating efficiency. More specifically, the first portion 331 of the heat pipe 33 is completely embedded in the heat conduction base 313 and in contact with the second surface 311b of the contact portion 311. More preferably, at least one base fin 313a (or any other simple heat conduction device) is formed on the outer surface of the heat conduction base 313 which is opposite to the contact portion 311. Increasing the base fin 313a will increase the heat exchange area and thus promote the cooling efficiency.

Figure 4B:
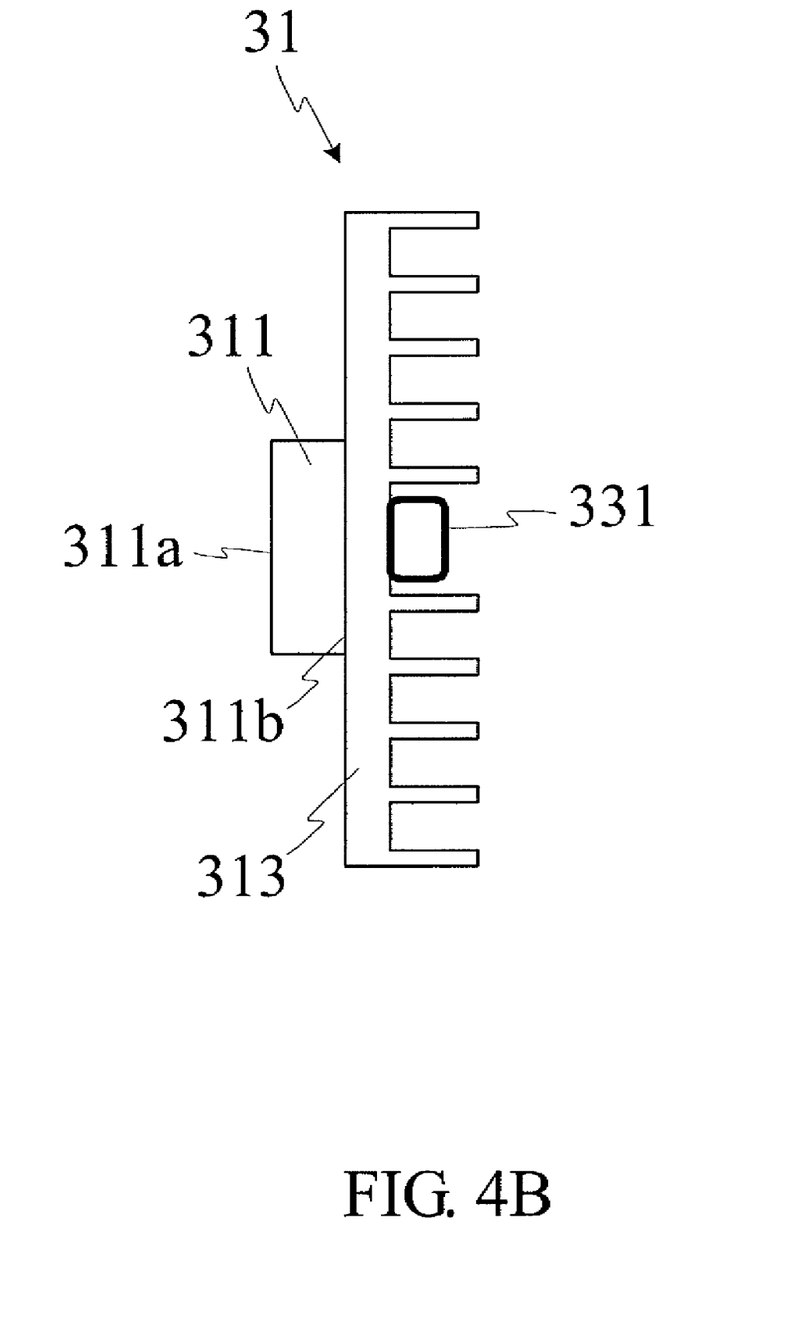
Figure 4C:
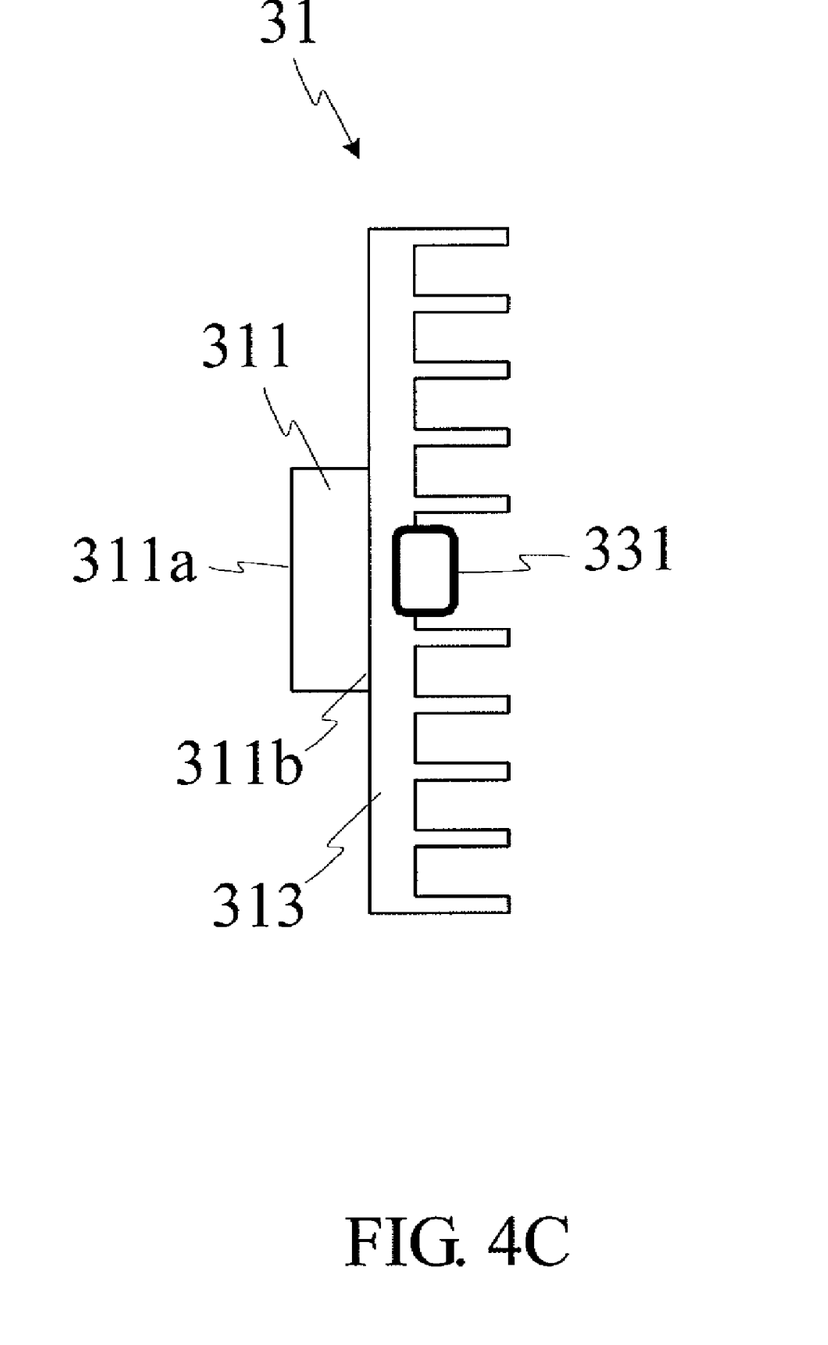

FIG. 4B and FIG. 4C show other embodiments of the heat conduction device 31. Unlike the aforementioned embodiment, the first portion 331 of the heat pipe 33 is attached onto the outer surface of the heat conduction base 313 and is opposite to the contact portion 311 as shown in FIG. 4B. In FIG. 4C, the first portion 331 of the heat pipe 33 is partially embedded in the heat conduction base 313 from the outer surface thereof.

It is noted that the heat conduction base 313 and the base fin 313a illustrated in FIGS. 4A, 4B, and 4C are only utilized to enhance the cooling efficiency, not as essential elements in the embodiments.

With reference to FIG. 2, the cooling module 30 of the present invention further comprises a fan 22 disposed adjacent to the fins 35. The fan 22 is suitable for generating a cooling airflow 221 which assists in outwardly dissipating hot air through the fins. Therefore, an airflow field can be generated from the cooling airflow 221 flowing in the projection apparatus 20. This airflow field can also cool other components. Preferably, the location of the fan 22 should be adjustable and thus guides the cooling airflow 221 substantially towards the interior of the projection apparatus 20 or more preferably, towards the light source 21. Generally, because the light source 21 is the main heat generating portion in the projection apparatus 20, the cooling airflow 221 directed at the light source 21 will help cool the light source 21.

Furthermore, a plurality of venting apertures 291 can be disposed on the housing 29 of the projection apparatus 20 to facilitate the formation of the airflow field. These venting apertures 291 can also coincide with other fans 24 to facilitate cooling other components in the projection apparatus 20. For example, in FIG. 2, the fans 24 are disposed opposite to the plurality of venting apertures 291 to draw airflows. This process can fully and efficiently contribute to the interior airflow field. Certainly, the positions of the fans 24 are not limited. The fans 24 can be alternatively disposed on the same side of the venting apertures 291 or other substitute locations.

In the ideal situation, light generated by the light source 21 should be guided into the optical engine 23 for projection. Nevertheless, scattering light is inevitable. For simplicity, light generated from the light source 21 will be differentiated into a first part and a second part herein (not shown in the figures). The first part of the light is guided into the optical engine for projection, while the second part of the light, which is not usable, scatters outward from the optical engine. Heat accumulated on the DMD module 25 results from the first part of the light generated by the light source 21, while the second part of the light may scatter outward from the housing 29, causing imperfections in the use and quality of the performance.

Figure 5:
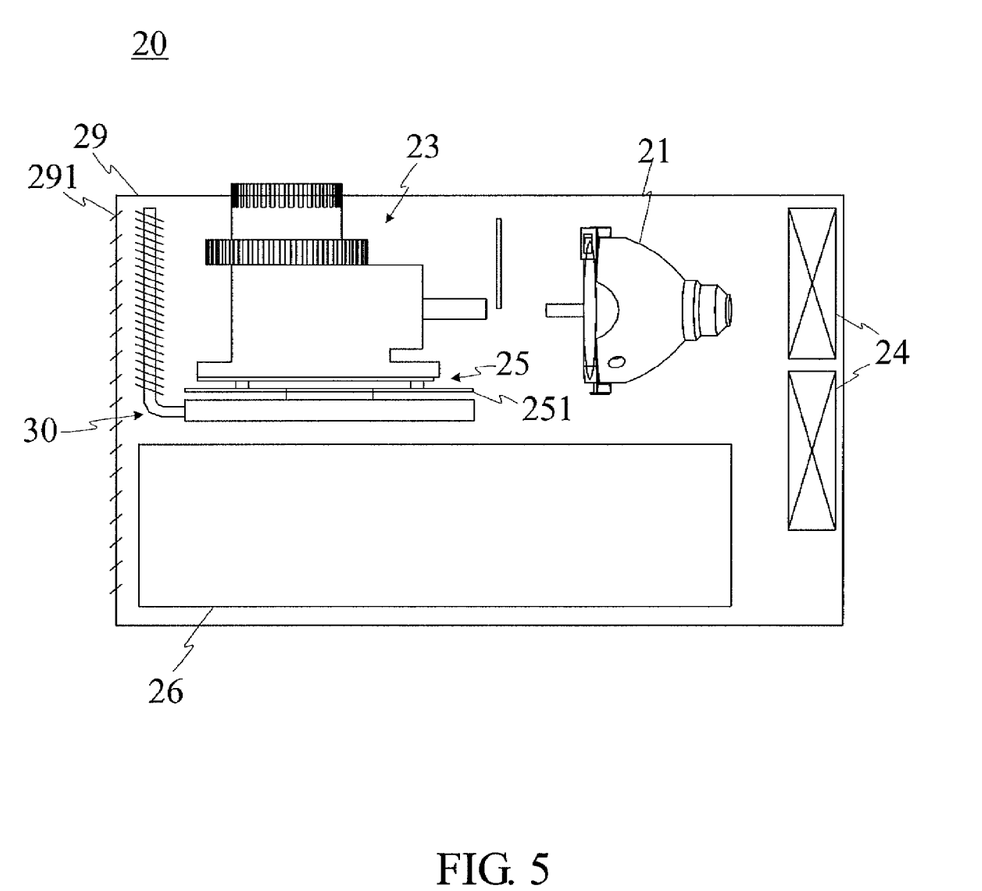
FIG. 5 is a schematic view illustrating another preferred embodiment of the projection apparatus of the present invention.

The second embodiment of the present invention provides an arrangement for dealing with the scattered second part of the light. As shown in FIG. 5, the cooling module 30 of the present embodiment works with fans 24 to generate airflow for cooling the fins 35 and also to shelter the second part of light from the light source 21.

Figure 6:
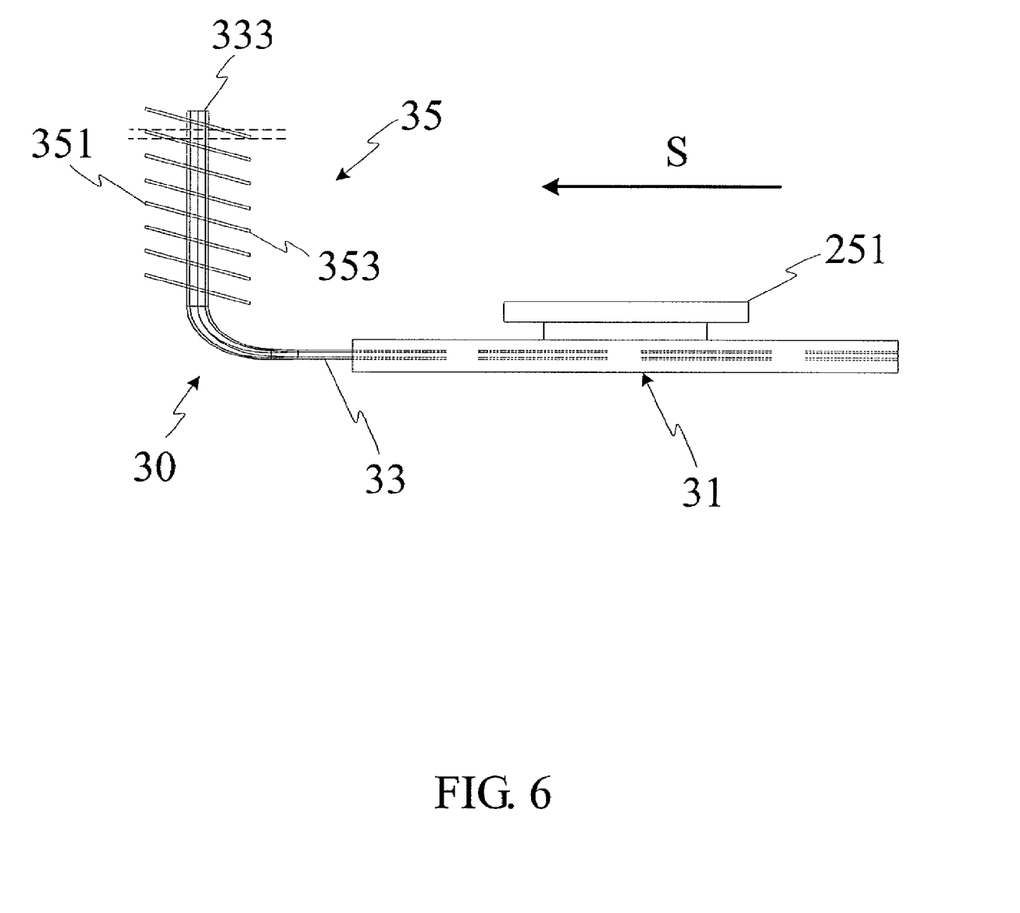
FIG. 6 is a schematic view illustrating a preferred embodiment of the heat conduction device as shown in FIG. 5.

FIG. 6 illustrates a schematic view of the cooling module 30 of the present embodiment. The plurality of fins 35 is disposed substantially along a lengthwise direction of the second portion 333 of the heat pipe 33, and successively parallel to one another. Consequently, a plurality of parallel spaces is formed for venting airflows and dissipating hot air. For simplicity, each of the fins 35 can be defined as having a first edge 351 and a second edge 353. The first edge 351 is opposite to the second edge 353 in view of the second portion 333 of the heat pipe 33. Each of the first edges 351 partially overlaps with the second edge 353 of the adjacent fin thereof along the illuminating direction S (as shown in FIG. 6 with broken lines) which is construed by the second part of light generated by the light source 21. In this embodiment, each of the fins 35 forms a substantially non-orthogonal angle with the second portion 333 of the heat pipe 33 and then forms overlaps for light sheltering. Alternatively, if each of the fins 35 forms an orthogonal angle with the second portion 333 of the heat pipe 33, the fins 35 do not provide light sheltering.

Figure 7:
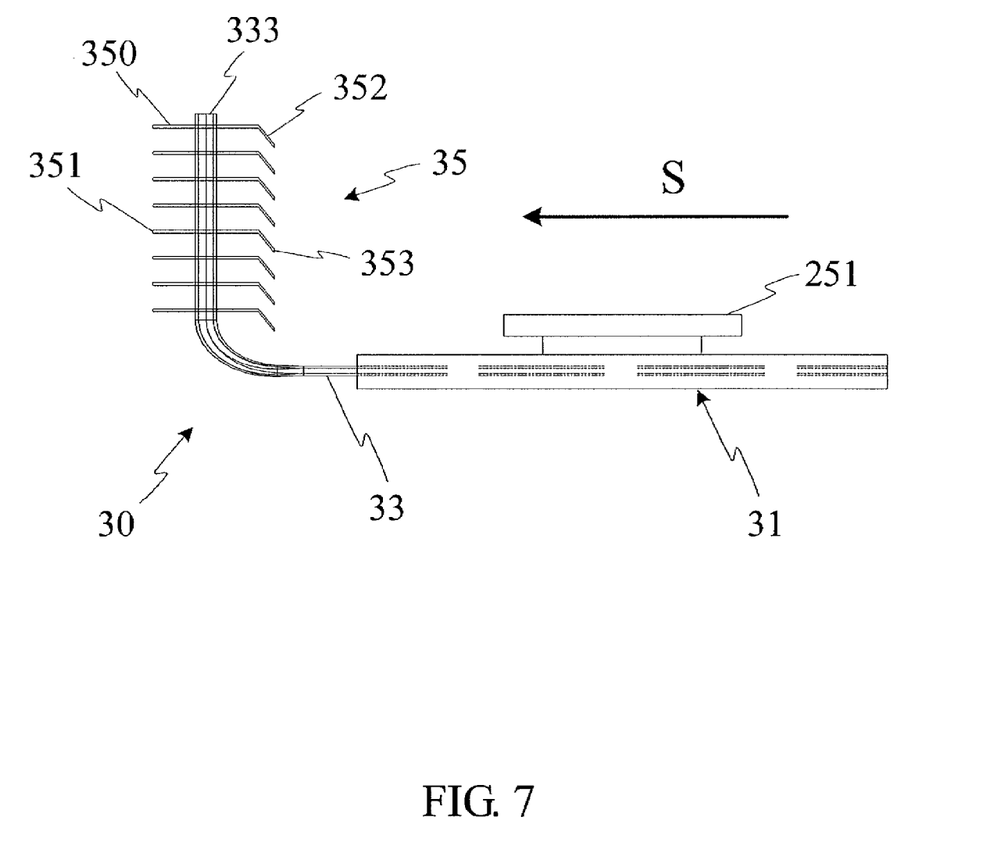
FIG. 7 is a schematic view illustrating another preferred embodiment of the heat conduction device as shown in FIG. 5.

Another embodiment of the plurality of fins 35 is shown in FIG. 7. Each of the fins 35 has a fin body portion 350 and a bending portion 352 which connects with the fin body portion 350. The first edge 351 is formed on the fin body portion 350 while the second edge 353 is formed on the bending portion 352. Specifically, the fin body portion 350 forms a substantially orthogonal angle with the second portion 333 of the heat pipe 33, while the bending portion 352 forms a substantially non-orthogonal angle with the second portion 333 of the heat pipe 33. The fins 35 have a plurality of bending portions 352 to increase the overlapping. Thus, the bending portion 352 and the fin body portion 350 at least partially overlap along the direction S of the second part of the light, generated by the light source 21, for shelter.

Figure 8:
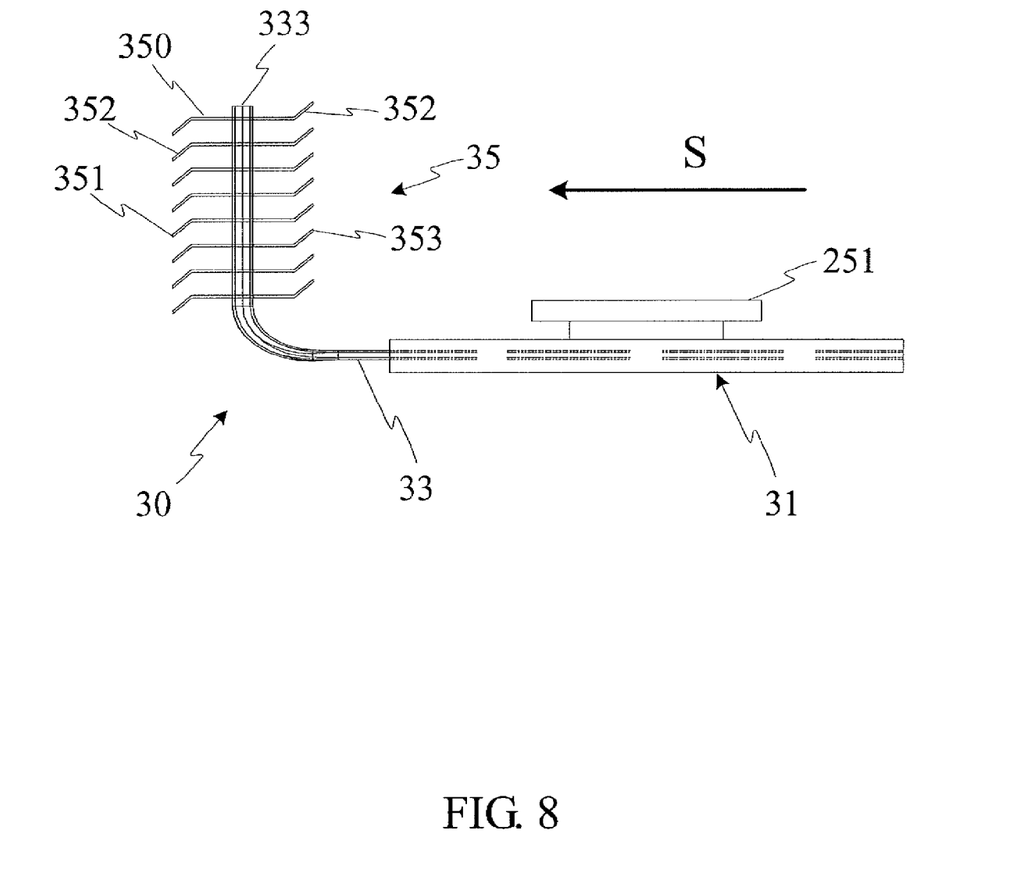
FIG. 8 is a schematic view illustrating still another preferred embodiment of the heat conduction device as shown in FIG. 5.

Another preferred embodiment is shown in FIG. 8. The bending portions 352 are respectively formed on the first edge 351 and the second edge 353 of the fins 35. More preferably, these two groups of bending portions 352 are disposed opposite each other. This can facilitate overlap formations along the direction S of the second part of the light.

Figure 9:
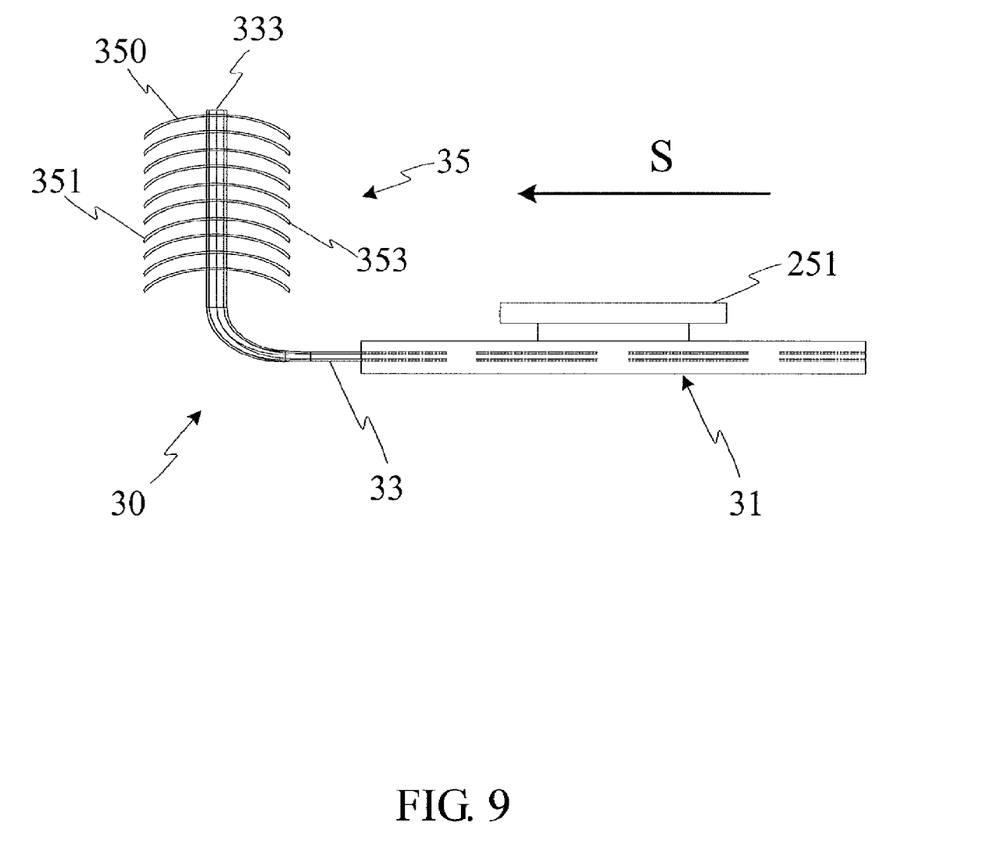
FIG. 9 is a schematic view illustrating yet another preferred embodiment of the heat conduction device as shown in FIG. 5.

FIG. 9 shows still another preferred embodiment of the present invention. In this embodiment, the fin body portion 350 has a cambered shape. Thus, a deviation is formed from the center to the first edge 351 and the second edge 353 of each fin 35. Overlaps for light sheltering can still be formed along the direction S of the second part of the light.

Figure 10:
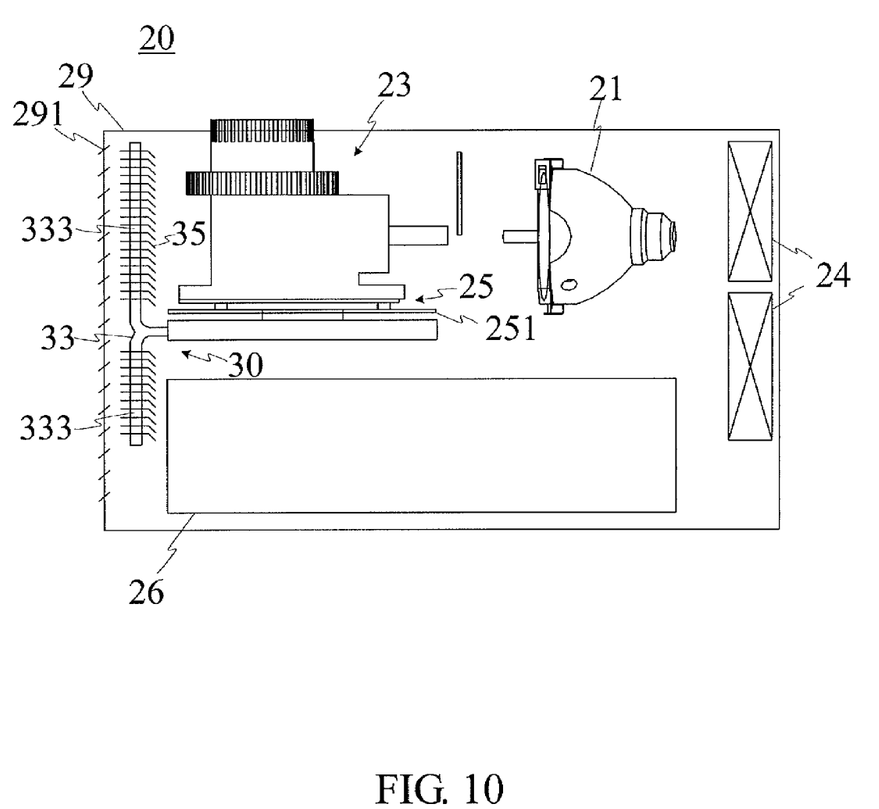
FIG. 10 is a schematic view illustrating still another preferred embodiment of the projection apparatus of the present invention.
Figure 11:
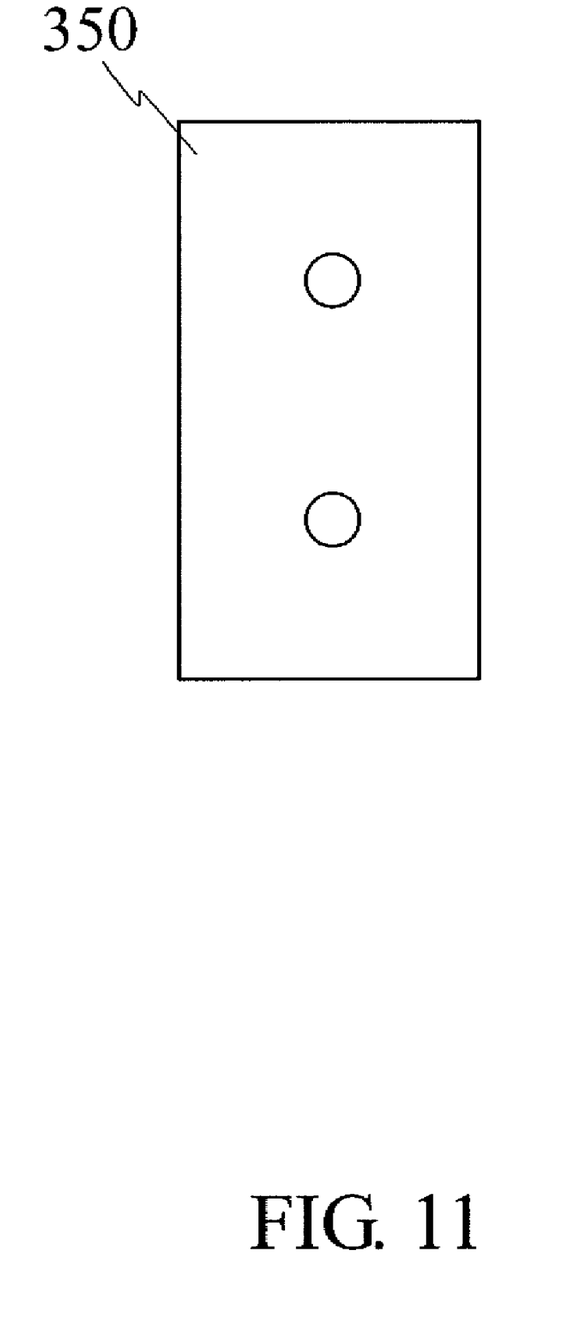
FIG. 11 is a schematic plan view illustrating fins connecting with two heat pipes.

The cooling module 30 of the present invention is not limited to be formed with a single heat pipe. As shown in FIG. 10, the second portion 333 of the heat pipe 33 has two sections that form an included angle therewith, and the fins 35 disposed on the heat pipe 33 are distributed on the two sections. Even though the plurality of heat pipes are not illustrated in the figures, either the first portion or the second portion of the heat pipe 33 is expected to be disposed with the fins 35 in plurality. Aforementioned embodiments can help cool the DMD module 25. For example, when the fins 35 of the present invention collaborate with the plurality of heat pipes 33, the fin body portion 350 has two holes which connect with two heat pipes 33 therethrough as shown in FIG. 11. To achieve the predetermined cooling efficiency, the way that the holes are to be designed depends on how many that the heat pipes 33 are given.

According to the aforementioned disclosures, the cooling module 30 of the present invention uses the heat pipe 33 and the fins 35 to enhance the cooling efficiency of the DMD module 25. The fins 35 can not only provide rapid cooling but also shelter light due to the overlaps between the fins 35. The conventionally disposed light shelter plate would be economized. This design thus benefits the DLP apparatus that contributes a narrow interior and an effective airflow field.

In addition, the fans 24 and the venting apertures 291 can be disposed on opposite sides, same sides or any other positions in the projection apparatus 20. Furthermore, the fans 24 can either draw or blow airflows. All of these can be adapted in the embodiments as shown in FIG. 5 and FIG. 10.

The above disclosure is related to the detailed technical contents and inventive features thereof People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A cooling module for use with a projection apparatus, the projection apparatus comprising a digital micro-mirror device (DMD) module and a light source, the cooling module comprising:
   a heat conduction device, comprising a first surface and being in contact with the DMD module via the first surface;
   at least one heat pipe, having a first portion and a second portion which connects to the first portion, the at least one heat pipe connecting to the heat conduction device at the first portion thereof; and
   a plurality of fins, connecting with the second portion of the heat pipe;
   whereby heat generated from the DMD module for processing light is removed outward from the heat conduction device through the heat pipe and the at least one plurality of fins, wherein each of the fins at least partially overlaps with the adjacent fin thereof, along an illuminating direction construed by a portion of light generated from the light source, and the second portion of the heat pipe and the plurality of fins are disposed directly in front of the light source to shelter the portion of light, the DMD module is disposed between the light source and the second portion of the heat pipe in which the second portion defines an axis that respectively orthogonal to a illumination direction and the first surface of the DMD module.

2. The cooling module as claimed in claim 1, wherein the DMD module further comprises a DMD chip being in contact with the heat conduction device, in which the DMD module is a main heat generating portion when processing the light.

3. The cooling module as claimed in claim 1, wherein the heat conduction device comprises:
   a contact portion, having a first surface and a second surface opposite to the first surface, wherein the first surface is disposed adjacent to the DMD module and the first portion of the heat pipe connects to the second surface.

4. The cooling module as claimed in claim 1, wherein the heat conduction device further comprises:
   a contact portion, having the first surface and a second surface opposite to the first surface, wherein the first surface is adjacent to the DMD module; and
   a heat conduction base adjacent to the second surface of the contact portion, the heat conduction base having an area greater than an area of the contact portion, and the first portion of the pipe connecting with the heat conduction base.

5. The cooling module as claimed in claim 4, wherein the heat conduction base is provided with at least one base fin which is formed on an outer surface thereof and opposite to the contact portion.

6. The cooling module as claimed in claim 4, wherein the heat pipe is attached on an outer surface of the heat conduction based and opposite to the contact portion.

7. The cooling module as claimed in claim 4, wherein the heat pipe is completely embedded in the heat conduction base from an outer surface thereof and opposite to the contact portion.

8. The cooling module as claimed in claim 4, wherein the heat pipe is completely embedded in the heat conduction base and in contact with the second surface of the contact portion.

9. The cooling module as claimed in claim 1, wherein the heat pipe is integrally formed with the heat conduction device.

10. The cooling module as claimed in claim 1, wherein the heat pipe is welded onto the heat conduction device.

11. The cooling module as claimed in claim 1, further comprising a fan disposed adjacent to the plurality of fins, wherein the fan is suitable to generate a cooling airflow which assists in dissipating hot air outward through the fins.

12. The cooling module as claimed in claim 1, wherein heat generated from the DMD module is originated from a first portion of light of the light source.

13. The cooling module as claimed in claim 12, further comprising a fan suitable to generate a cooling airflow which assists in dissipating hot air outward from the fins.

14. The cooling module as claimed in claim 13, wherein the cooling airflow is substantially guided toward an interior of the projection apparatus.

15. The cooling module as claimed in claim 14, wherein the plurality of fins are substantially disposed along a lengthwise direction of the second portion of the heat pipe and are successively parallel to one another, to form a plurality of parallel spaces for dissipating the hot air.

16. The cooling module as claimed in claim 15, wherein each of the fins has a first edge and a second edge, and the first edge is opposite to the second edge in view of the second portion of the heat pipe.

17. The cooling module as claimed in claim 16, wherein the first edge of each of the fins at least partially overlaps with the second edge of the adjacent fin thereof, along an illuminating direction construed by a second portion of light of the light source.

18. The cooling module as claimed in claim 16, wherein each of the fins has a fin body portion and a bending portion connecting with the fin body portion, and the first edge is formed on the fin body portion whereas the second edge is formed on the bending portion.

19. The cooling module as claimed in claim 16, wherein the plurality of fins forms a substantially non-orthogonal angle with the second portion of the heat pipe.

20. The cooling module as claimed in claim 18, wherein each of the fin body portions substantially forms an orthogonal angle with the second portion of the heat pipe, and each of the bending portions substantially forms a non-orthogonal angle with the second portion of the heat pipe.

21. The cooling module as claimed in claim 1, wherein the second portion of the heat pipe has two sections which form an included angle therewith, and the fins are distributed on the two sections.

\* \* \* \* \*